United States Patent
Kado et al.

(10) Patent No.: US 9,746,045 B2
(45) Date of Patent: Aug. 29, 2017

(54) METHOD OF FASTENING ADHEREND TO COATING OBJECT, AND FASTENED COMPOSITE

(71) Applicant: DENSO CORPORATION, Kariya, Aichi-pref. (JP)

(72) Inventors: Kunihiro Kado, Toyokawa (JP); Kazunori Mizutori, Toyohashi (JP); Yasuo Tabuchi, Toyoake (JP); Shigeyoshi Sakuraba, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 304 days.

(21) Appl. No.: 14/413,597

(22) PCT Filed: Jul. 3, 2013

(86) PCT No.: PCT/JP2013/068287
§ 371 (c)(1),
(2) Date: Jan. 8, 2015

(87) PCT Pub. No.: WO2014/010489
PCT Pub. Date: Jan. 16, 2014

(65) Prior Publication Data
US 2015/0167766 A1    Jun. 18, 2015

(30) Foreign Application Priority Data

Jul. 10, 2012  (JP) .................................. 2012-154607
Jun. 5, 2013   (JP) .................................. 2013-118976

(51) Int. Cl.
*B32B 7/12*   (2006.01)
*B32B 15/04*  (2006.01)
(Continued)

(52) U.S. Cl.
CPC ................ *F16D 69/04* (2013.01); *B32B 7/12* (2013.01); *B32B 37/182* (2013.01);
(Continued)

(58) Field of Classification Search
None
See application file for complete search history.

(56) References Cited

U.S. PATENT DOCUMENTS

| | | |
|---|---|---|
| 5,361,883 A | 11/1994 | Yamamoto |
| 2002/0197397 A1 | 12/2002 | Staheli |

(Continued)

FOREIGN PATENT DOCUMENTS

| | | |
|---|---|---|
| GB | 1593804 A | 7/1981 |
| JP | S53134832 A | 11/1978 |

(Continued)

OTHER PUBLICATIONS

Office Action dated Apr. 6, 2016 in corresponding Chinese Application No. 201380035623.6 with English translation.

(Continued)

*Primary Examiner* — Ramsey Zacharia
(74) *Attorney, Agent, or Firm* — Harness, Dickey & Pierce, P.L.C.

(57) ABSTRACT

Provided are a fastened composite and a method of fastening an adherend, which includes a friction material, to a coating object, comprising; forming on at least a part of a surface of the coating object a coated film with a curable resin-containing paint; and fastening the adherend to the surface of the coating object, by subjecting heating and/or irradiation of an active energy ray to the coated film, while making the adherend closely contact the coated film to press it by a predetermined pressure, to cure the coated film.

5 Claims, 5 Drawing Sheets

(51) Int. Cl.
*C09D 5/08* (2006.01)
*C09J 5/06* (2006.01)
*F16D 69/04* (2006.01)
*F16D 27/112* (2006.01)
*B32B 37/18* (2006.01)
*B32B 38/00* (2006.01)

(52) U.S. Cl.
CPC ........ *B32B 38/0008* (2013.01); *F16D 27/112* (2013.01); *B32B 15/04* (2013.01); *B32B 2475/00* (2013.01); *C09D 5/08* (2013.01); *C09J 5/06* (2013.01); *F16D 2069/0475* (2013.01); *F16D 2250/0046* (2013.01); *Y10T 428/31515* (2015.04)

(56) References Cited

U.S. PATENT DOCUMENTS

2003/0217800 A1 11/2003 Kim et al.
2008/0067028 A1* 3/2008 Nagaya ............... F16D 27/112
                                             192/84.941

FOREIGN PATENT DOCUMENTS

| | | |
|---|---|---|
| JP | H04290618 A | 10/1992 |
| JP | H07305035 A | 11/1995 |
| JP | H08114241 A | 5/1996 |
| JP | H08277516 A | 10/1996 |
| JP | 2002509199 A | 3/2002 |
| JP | 2004044792 A | 2/2004 |
| JP | 2004195728 A | 7/2004 |
| JP | 2004278558 A | 10/2004 |
| JP | 2005180474 A | 7/2005 |
| JP | 2007-127221 | 5/2007 |
| JP | 2007127221 A | 5/2007 |

OTHER PUBLICATIONS

International Search Report (in Japanese with English Translation) for PCT/JP2013/068287, mailed Aug. 20, 2013; ISA/JP.
Office Action dated Aug. 28, 2015 in corresponding Chinese Application No. 201380035623.6.

* cited by examiner

METHOD OF FASTENING ADHEREND TO COATING OBJECT, AND FASTENED COMPOSITE

CROSS REFERENCE TO RELATED APPLICATIONS

This application is a U.S. National Phase Application under 35 U.S.C. 371 of International Application No. PCT/JP2013/068287 filed on Jul. 3, 2013 and published in Japanese as WO 2014/010489 A1 on Jan. 16, 2014. This application is based on and claims the benefit of priority from Japanese Patent Applications No. 2013-118976 filed Jun. 5, 2013 and No. 2012-154607 filed Jul. 10, 2012. The entire disclosures of all of the above applications are incorporated herein by reference.

TECHNICAL FIELD

The present invention relates to a method of fastening an adherend to a coating object, and a fastened composite which is obtained by that method. More particularly, it relates to an improved method of fastening a friction material in a friction type power transmission system, power absorption system, etc., and a fastened composite which is obtained by this method.

BACKGROUND ART

For example, in a clutch, brake, automatic transmission, limited slip differential, hoist, synchronizer, torque converter, torque transmission system, or other friction type power transmission system or power absorption system etc., in general, one or more sets of co-actuating members are provided together with a friction material. One of the co-actuating members is driven or braked by the other.

Further, to transmit rotational drive force to a compressor for an air-conditioner which is mounted in an automobile, or to disconnect it, in the past, a magnetic clutch including a mechanism for transmission of rotational drive force through the friction surface of a friction material has been used (see Japanese Patent Publication Nos. H08-114241A and 2005-180474A).

Therein, it has been considered important to secure the fixing strength of the friction material to the apparatus to improve the operating performance and safety in an automobile in which the apparatus was mounted. Higher fixing strength has been demanded for fixing a friction material to a friction material-fixing portion of the apparatus. Note that, in this apparatus, in order to improve the corrosion resistance, cation electrodeposition coating etc., was usually used to coat, dry, and cure a paint containing a thermosetting resin etc., in a coating process, and thus the friction material-fixing portion was also coated.

In order to fix the friction material to the friction material-fixing portion, after the paint containing a thermosetting resin etc., being coated and cured in advance in this way, for improving the strength of fixing the friction material to the friction material-fixing portion, usually it was necessary to interpose an adhesive sheet or adhesive containing an adhesive ingredient to adhere them. Such an adhesive sheet or adhesive has been used to secure a predetermined adhesive strength. Therein, in order to interpose an adhesive layer, in addition to the preliminary layer formed by coating the paint containing a thermosetting resin etc., for the purpose of improving the corrosion resistance, complicated quality controls, such as suitably controlling qualities of three interfaces of the interface between the friction material-fixing portion and the layer of coating, the interface between the layer of coating and the adhesive layer, and the interface between the adhesive layer and friction material, are considered necessary.

As specific examples thereof, for example, Japanese Patent Publication No. 2004-044792A aims to provide an apparatus and method of attaching and joining a friction material to a clutch pulley, which enable automatic inspection of the coated state of a liquid phase adhesive which is coated in a friction material groove in the process of adhesion of a friction material at a clutch pulley, and thereby enable improvement of productivity and prevention of products with poorly adhered friction materials, and discloses a method of bonding a friction material to a clutch pulley, including a step of intermittently transferring a clutch pulley (P) by a transferring means, the clutch pulley having a friction material inserting groove (G) of a round shape wherein friction material (FM) is inserted into an end thereof; a step of injecting and coating a liquid phase adhesive by a dispenser unit having a nozzle capable of injecting the liquid phase adhesive (A) into the friction material inserting groove (G) of the clutch pulley (P); a coated state confirming step of sensing the coated condition of the liquid phase adhesive (A) coating the friction material inserting groove (G) of the clutch pulley (P) and generating warning sound if the coated condition of the liquid phase adhesive (A) is bad; a step of inserting the friction material (FM) into the friction material inserting groove (G) of the clutch pulley (P) coated with the liquid phase adhesive (A) by a friction material inserting means; and a step of induction-heating and hardening the liquid phase adhesive (A) by an induction heating means while compressing the friction material (FM) to bond the friction material to the friction material inserting groove (G). Therein, the friction surface of the magnetic clutch is provided with a groove for fitting the friction material over the entire circumference of the clutch pulley to adhere the friction material to that groove to transmit power.

Note that, while not explicitly shown in Japanese Patent Publication No. 2004-044792A, in such a clutch pulley, usually it was considered necessary to coat the surface of the clutch pulley in advance with a paint containing a thermosetting resin etc., then heat it to cure the resin and form a paint film so as to improve the corrosion resistance of the clutch pulley. Japanese Patent Publication No. H04-290618A describes electrodeposition coating of the clutch rotor as such a rust-proofing treatment.

Figure 5:
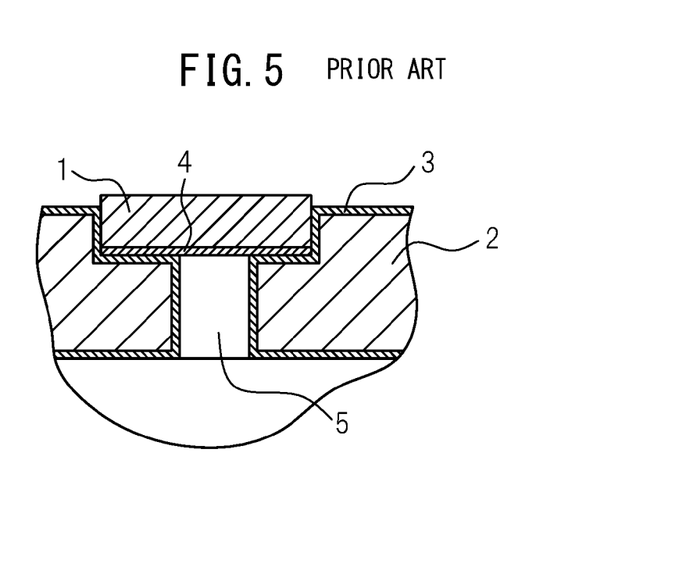
FIG. 5 is an explanatory view schematically showing a cross-sectional enlarged view of an adhered composite with a four-layer structure, for adhesion of a friction material in a rotor of a magnetic clutch, as the prior art.

FIG. 5 schematically shows, as an example of such a prior art, an adhered composite with a four-layer structure, obtained by coating and curing a paint containing a thermosetting resin etc., in advance at the surface of a rotor 2 having a groove part and through holes 5 at the bottom part of that in a magnetic clutch, i.e., a coating object, so as to form a paint film 3, then coating an adhesive 4 or attaching an adhesive sheet 4 for the purpose of adhering the surface of the paint film 3 in the groove part and a friction material 1, i.e., an adherend, adhering the two and thereby attaching the friction material 1 to the magnetic clutch rotor 2.

Figure 6:
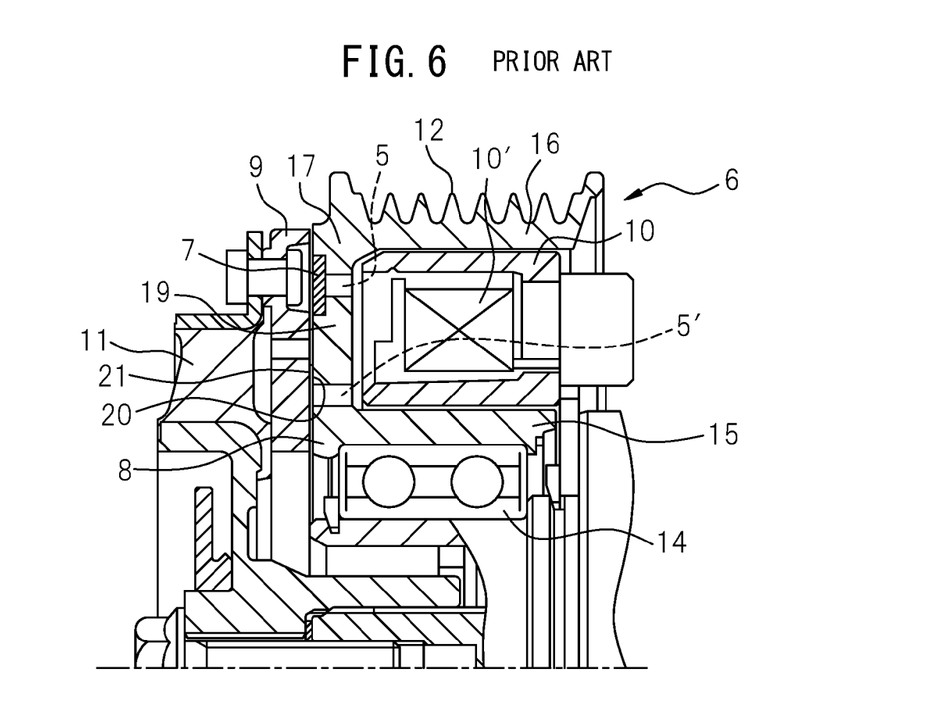
FIG. 6 is an explanatory view which shows a specific example of a magnetic clutch in the prior art.

Further, FIG. 6 shows, as a reference example of a magnetic clutch in such a prior art, one provided with a rotor 8 having a friction surface of a friction material 7 which rotates upon transmission of rotational drive force, an armature 9 having a friction receiving surface which is arranged facing the friction surface of the rotor 8, electromagnetic coils 10, 10' which are energized to generate magnetic force and pull the armature 9 to the rotor 8 side, and a hub 11 which transmits rotational drive force of the armature 9 to a compressor. Note that, a magnetic clutch 6 is provided for engaging and disengaging rotational drive force which is transmitted from a not shown engine of an automobile to a refrigerant compressor for an automobile air-conditioning system, so is comprised of a rotor 8 formed integrally with the pulley 12 which is driven to rotate by the engine, a hub 11 as a driven rotary member being provided with an armature 9 which faces the rotor 8 and can engage by friction, electromagnetic coils 10, 10' which are energized to generate magnetic force, pull the armature 9 and thereby make this engage by friction with the rotor 8, etc. The pulley 12 has a not shown multi-ribbed V-belt wound around it, while the rotor 8 is supported to freely rotate through a bearing 14 at its inside circumference. The rotor 8 is comprised of a ring-shaped inside wall 15 which is positioned at the inside circumference side of the electromagnetic coil 10, a ring-shaped outside wall 16 which is positioned at the outside circumference side of the electromagnetic coil 10 and is formed integrally with the pulley 12, and a ring-shaped bottom wall 17 which can engage by friction with the armature 9. While ring shaped overall, the partial radial direction cross-section is U-shaped. The bottom wall 17 is provided with arc-shaped through holes 5, 5' which perform the role of breaking the magnetic paths. The arc-shaped through holes 5, 5' prevent the formation of magnetic paths directly between their inside walls 15 and the magnetic material part 19 and between the magnetic material part 19 and the outside walls 16, and are for making the magnetic flux repeatedly cut across and pass the frictionally engaged surfaces between the friction surface 20 of the rotor 8 and the friction surface 21 of the armature 9. In addition to the arc-shaped through holes 5 (corresponding to arc-shaped through hole 5 in FIG. 5), a ring-shaped groove is formed at the outer circumferential side of the friction surface of the bottom wall 17 (corresponding to rotor 2 in FIG. 5). In that groove, to raise the engagement force with the armature 9, a ring-shaped friction material 7 (corresponding to friction material 1 in FIG. 5) is fit as shown as FIG. 5, whereby the adhered composite with the four-layer structure is formed.

Note that, regarding the method of adhering parts when assembling a general product, Japanese Patent Publication No. H07-305035A discloses a method of adhering by a resin-based paint, comprising coating at least one part of two or more parts to be adhered with a resin-based paint which has adhesiveness, assembling the coated part to abut against another part, then baking it to adhere the abutting portions of the parts by the adhesive strength of the paint. However, with such a method of adhesion, depending on the obtained product, sometimes the adhesion strength is insufficient, so further improvement has been required.

SUMMARY OF INVENTIONS

In the above way, coating an adhesive for the purpose of adhering the surface of a paint film, obtained after a paint containing a thermosetting resin etc., being coated and cured in advance, and an adherend, such as a friction material or the like, to thereby adhere the two required the step of specially coating an adhesive for adhesion, and had the problems of an increase in the costs of the adhesive and other materials, the labor and time required for this step, and the cost of the equipment for it and a drop in productivity due to the load in management of the coating of adhesive etc., and further had the problem that the required adhesive strength was difficult to obtain, merely with coating one part with a resin-based paint having adhesiveness, assembling the coated part with another part in an abutting state, and then baking them.

The present invention was made in consideration of these problems in the prior art, and has as its object to eliminate the step in the prior art of coating an adhesive to thereby adhere the surface of a paint film and a friction material for the purpose of adhering the surface of the paint film, obtained after a paint containing a thermosetting resin etc., being coated and cured in advance, and the friction material; and to thereby provide a method of fastening and a fastened composite which can sufficiently secure the required fastening strength by a simpler constitution than in the past. In addition, the present invention, in some cases, has as its object the prevention of the increase in the cost of the adhesive and other materials, the labor and time required for the process, the cost of the equipment for the same, etc., and the decrease in productivity due to the load for quality control of the adhesive coated state etc., in the prior art. Furthermore, the present invention, in some cases, has as its object the solution of the conventional problem of the difficulty of obtaining the required adhering strength by just coating a paint having adhesiveness on one part, assembling it to abut against another part, then baking it.

The method of fastening of a first aspect of the present invention, as described in claim 1, is characterized by a method of fastening an adherend (51), which includes a friction material, to a coating object (50), comprising; forming on at least a part of a surface (54) of the coating object (50) a coated film (53') with a curable resin-containing paint; and fastening said adherend (51) to the surface (54) of the coating object (50), by subjecting heating and/or irradiation of an active energy ray to the coated film (53'), while making the adherend (51) closely contact the coated film (53') to press it by a predetermined pressure, to cure the coated film (53').

In such a first aspect, it is possible to eliminate the step in the prior art of coating an adhesive to thereby adhere the surface of a paint film and a friction material for the purpose of adhering the surface of the paint film, obtained after a paint containing a thermosetting resin etc., being coated and cured in advance, and the friction material; and to provide a method of fastening which can sufficiently secure the required fastening strength by a simpler constitution than in the past.

The fastened composite of the second aspect of the present invention, as described in claim 5, is characterized by a fastened composite in which an adherend (51) comprising a friction material has been fastened to a coating object (50), wherein the adherend (51) is fastened on at least a part of a surface (54) of the coating object (50) by a coated film (53) cured in a state being closely contact with the adherend (51) while the adherend (51) being pressed at a predetermined pressure to a coated film (53') formed with a curable resin-containing paint on the at least a part of the surface (54) of the coating object (50).

In this second aspect, it is possible to eliminate an adhesive layer in the prior art for coating an adhesive to thereby adhere the surface of a paint film and a friction material for the purpose of adhering the surface of the paint film, obtained after a paint containing a thermosetting resin etc., being coated and cured in advance, and the friction material; and to provide a fastened composite which has been fastened at a required and sufficient fastening strength by a simpler constitution than in the past.

That is, in the present invention, the fastened composite can be obtained, in which the coating object (50) and the adherend (51) are fastened at a required and sufficient fastening strength, by that the adherend (51) which includes the friction material is pressed at a predetermined pressure to the coated film (53') of the curable resin-containing paint which has been formed on the surface (54) of the coating object (50); the curable resin-containing paint which has melt etc., to be given fluidity enters into the clearance between the coating object (50) and the adherend (51); then the uncured coated film (53') cures in a state being closely contact with said adherend (51); and the coating object (50) and the adherend (51) are joined by chemical bonds or intermolecular force. Note that, the pressing action at that time is necessary for eliminating the clearance between the coating object and adherend at the time of fluid motion of the curable resin-containing paint.

In addition, in this present invention, the coated film of the curable resin-containing paint is provided with the function of not only the inherent object of paint of improving the corrosion resistance at a coating object (50), but also fastening an adherend (51) which includes a friction material to a coating object (50) at a predetermined fastening strength. Further, in such a present invention, there is no longer a need for a special adhesive layer previously considered necessary for adhering the surface of a paint film after curing and an adherend, and it is sometimes possible to prevent an increase in the cost of the adhesive and other materials, and the labor and time required for the adhesive treatment process, and the cost of equipment for the same and a decrease in the productivity due to the load etc., for quality control of the adhesive coated state etc. Furthermore, in the present invention, it becomes possible to easily fasten an adherend to a coating object, or possible to provide a fastened composite with a simple structure by being fastened in a short time by a predetermined fastening strength.

EMBODIMENTS FOR CARRYING OUT INVENTION

A first aspect of the present invention, that is, a method of fastening an adherend (51) including a friction material to a coating object (50), is explained in detail below.

The coating object (50) in the present invention is not particularly limited, but as specific examples in which the coating object (50) is used, a clutch, brake, automatic transmission, limited slip differential, hoist, synchronizer, torque converter, torque transmission system, other friction type power transmission system or power absorption system etc., may be exemplified. Among these, a friction type power transmission system and a power absorption system are preferable, a friction type power transmission system is more preferable, and a magnetic clutch is particularly preferable. As a specific example of such a coating object (50), a magnetic clutch rotor etc., may be exemplified.

As the adherend (51) including a friction material in the present invention, specifically, a composite material which includes a porous material as the friction material, a thin sheet material, such as metal, which is excellent in closeness of contact with the curable resin-containing paint and etc., may be exemplified. Among these, the composite material which includes a porous material is preferable as an adherend (51). In the case of using as the adherend (51) a member with unevenness on its surface such as a composite material including a porous material, when an uncured coated film (53') is cured in the state that the adherend (51) is pressed against the coated film (53') and is close contact with the coated film (53'), the curable resin-containing paint flows into the concave parts and then cures to result in an anchoring effect, and thus a predetermined fastening strength can be easily obtained between the adherend (51) and the coating object (50). For this reason, in particular a composite material which includes a porous friction material can be advantageously used in a friction type power transmission system and power absorption system.

The form of the curable resin-containing paint which is used in the present invention is not particularly limited, but specifically, for example, one in a powder state, one in a liquid state such as electrodeposition paint or spray paint, and one in a paste state etc., may be exemplified. Among these, one in a powder state is preferable.

When in this way the curable resin-containing paint is in a powder state, the shape and size of the powder particles are not particularly limited. Powder of the usual shape and size can be used. For example, the particle size distribution is preferably 10 to 250 µm in range, particularly preferable from 20 µm to 100 µm in range. Further, this average particle size is preferably from about 30 µm to 60 µm. Still further, this powder state curable resin-containing paint can be prepared by usual methods.

In the present invention, the method of forming the coated film (53') by the curable resin-containing paint is not particularly limited, but preferably, as explained above, the powder state curable resin-containing paint may be powder-coated by frictional charging type powder coating, such as a frictional charging system of electrostatically charging the powder in a fluidized bed, an electrostatic powder spraying method of spraying an electrostatically charged powder, or the like. According to such frictional charging type powder coating, the coated film (53') which is formed becomes uniform, the cured coated film (53) also easily becomes uniform, and in turn the fastening strength of the adherend (51) to the surface (54) of the coating object (50) easily becomes uniform. In particular, the frictional charging type powder coating by the electrostatic powder spraying method is preferable since it becomes easy to form a uniform coated film (53') at a coating object (50) which has a complicated surface shape such as a groove shape part (57).

Such a coated film (53') of the curable resin-containing paint is formed on at least part of the surface (54) of the coating object (50), but the object of formation of the coated film (53') is also the improvement of the corrosion resistance of the coating object (50), therefore the coated film (53') is preferably formed at all of the surfaces where improvement of the corrosion resistance is required at the surface of the coating object (50).

In the present invention, the shape of the surface of the coating object (50), on which the coated film (53') is formed, is not particularly limited. It may be one which does not have a groove shape, but preferably is one which has a groove shape (57). If a coated film (53') is formed on the surface of a coating object (50) which has a groove shape (57) in this way, a fastening strength can be more easily obtained than with the case not having a groove shape, since when fastening the adherend (51) to the groove shape part (57), the adherend (51) is pressed and the curable resin-containing paint flows to the side surfaces of the groove shape part as well to flow in without clearance and easily cure. In other words, when the shape of the surface of the coating object (50) is one which has a groove shape (57), the coated film (53') is easily held, and in turn the fastening strength of the adherend (51) to the surface (54) of the coating object (50) is easily improved, and fastening can be easily stabilized. The shape of the groove is not particularly limited so long as at least a part of the adherend (51) including a friction material can be inserted, but preferably it is one where the majority of the adherend (51) can be inserted.

At the surface (54) of the coating object (50) which has such a groove shape (57), it is preferable to form a coated film (53') at the bottom surface and two side surfaces of the groove shape part, and press the adherend (51) including a friction material against the uncured coated film (53') at a predetermined pressure while causing it to cure to thereby fasten the adherend (51) to the coating object (50) at least at the bottom surface (57) of the groove shape part (57), in particular at the bottom surface (54) and two side surfaces. If, in this way, forming the coated film (53') at the bottom surface and two side surfaces of the groove shape part (57), the fastening strength of the adherend (51) and coating object (50) can be secured both at the bottom surface of the groove shape part (57) and at the two side surfaces, and in turn the fastening strength of the adherend (51) to the coating object (50) is easily improved and fastening is easily stabilized.

Note that, in the present invention, even when using, as the shape of the surface of the coating object (50) on which the coated film (53') is formed, one which does not have a groove shape, it is possible to eliminate the step in the prior art of coating an adhesive, for the purpose of adhering an adherend and the surface of a paint film, which was obtained after coating and curing a paint containing a thermosetting resin etc., on the surface of the coating object in advance, and thereby adhering the same. Therefore, it remains true that the necessary fastening strength can be sufficiently secured by a simpler constitution than the past. In this case, if using as an adherend (51) a member having unevenness at the surface, such as a composite material which includes a porous material, when the uncured coated film (53') is cured in the state where the adherend (51) is pressed against the coated film (53'), an anchoring effect can be obtained due to the curable resin-containing paint flowing into the concave parts and curing there. Thus, using as the adherend (51) the member having unevenness at the surface is preferable.

As the curable resin which can be contained in the curable resin-containing paint in the present invention, a thermosetting resin and an active energy ray-curable resin may be exemplified.

Such a thermosetting resin is not particularly limited, but specifically, for example, thermosetting resins in the form of a molding compound derived from an epoxy resin or an unsaturated polyester resin, a DAP resin (polydiallyl phthalate), a MF molding compound, curable melamine/phenol/formaldehyde molding compound, or a polycondensate of cross-linkable polyurethanes; and thermosetting resins in the form of a molding compound of a curable phenol/formaldehyde plastic, a curable bisphenol resin, a curable urea/formaldehyde plastic, polyimides or a bismaleimide, or a polyadduct such as polybenzoimidazoles, may be exemplified. Among these, an epoxy resin is preferable.

The active energy ray-curable resin is not particularly limited, but, for example, a resin which has unsaturated groups in its molecular chain or side chains may be exemplified. More specifically, an unsaturated polyester resin, polyester (meth)acrylate resin, epoxy (meth)acrylate resin, polyurethane (meth)acrylate resin, polyether (meth)acrylate resin, polyallyl compound, polyvinyl compound, polyacrylated silicone resin and polybutadiene etc., may be exemplified.

The above such thermosetting resin and active energy ray-curable resin may be mixed for use. Use of either is preferable. From the viewpoint of easiness of curing treatment, after the coated film being formed, and uniformity of the resulting curing, a thermosetting resin is preferable.

The composition of the curable resin-containing paint in the present invention is not particularly limited. Specifically, for example, the content of such a curable resin is 40 to 80 wt %, preferably 50 to 70 wt %. More preferably, other ingredients may be contained at the desired contents in accordance with need.

For example, when the curable resin is a thermosetting resin, in addition to a thermosetting resin, a curing agent, curing accelerator, etc., may be included in accordance with need. The type and content of such a curing agent or curing accelerator are not particularly limited. These in usually used types may be contained in the usual contents.

Further, when the curable resin is an active energy ray-curable resin, in addition to the active energy ray-curable resin, a radical polymerization initiator such as a photopolymerization initiator, filler, additives, etc., may be included in accordance with need. The type and content of such a radical polymerization initiator etc., are not particularly limited. These in usually used types may be contained in the usual contents.

In addition, when the method of forming the coated film is the frictional charging type powder coating as explained above, along with the curable resin etc., the usually used thermoplastic resin, charge controllers or charge enhancers may be included in accordance with need.

In the present invention, the thickness of the coated film (53') which is formed with the curable resin-containing paint is not particularly limited, but, for example, a 30 to 60 μm thickness is effective for improving the fastening strength and stabilizing the fastening of the coating object (50) and the adherend (51) including a friction material.

In the present invention, the method and conditions for forming the coated film (53') with the curable resin-containing paint are not particularly limited. The usually used method and conditions can be suitably selected. For example, when the curable resin-containing paint is in a powder state, a method using a fluidized bed, fluidized bed coating method, electrostatic coating method, flame spraying method, etc., may be exemplified. Among these, the electrostatic coating method is preferable.

In the present invention, the method and conditions for curing the coated film (53') of the curable resin-containing paint which has been formed on at least part of the surface of the coating object (50) are not particularly limited. The usually used method and conditions can be suitably selected.

For example, when the curable resin is a thermosetting resin, as the heating means, electromagnetic heating such as induction heating, dielectric heating or the like, or an usually used method such as heating in a constant-temperature tank, resistance heating, far infrared heating or the like may be suitable selected. When the coating object (50) is a conductor such as iron, aluminum, copper, or another metal, induction heating is preferable, while when the coating object (50) is not conductive, dielectric heating is preferable. The heating temperature and the curing time can be suitably selected from the composition of the curable resin-containing paint or the thickness of the coated film, but usually the heating temperature is preferably 130 to 250° C. Further, as the time of curing by heating, for example, when the coating object (50) is a conductor such as metal, if using induction heating, the curing time can be shortened to within 1 minute, although also depending on the shape or mass of the coating object (50).

When the curable resin is an active energy ray-curable resin, irradiation of the active energy ray is used, but as the active energy ray, electron beams, ultraviolet rays, gamma rays, etc., may be exemplified. The irradiation conditions may be suitably selected by the composition of the curable resin-containing paint or the thickness of the coated film, but usually the energy ray is irradiated so that the cumulative amount of the active energy ray becomes 50 to 5000 $mJ/cm^2$.

In the present invention, when curing the coated film (53') of the curable resin-containing paint which has been formed on at least part of the surface of the coating object (50), an adherend (51) including a friction material is placed in close contact with the uncured coated film (53') and pressed by a predetermined pressure. As the predetermined pressure of the pressing action, 100 to 300 kPa is preferable. By curing the uncured coated film (53') of the curable resin-containing paint, while pressing the adherend (51) against the uncured coated film (53') of the curable resin-containing paint under such pressure, a predetermined fastening strength is reliably obtained.

In the present invention, the predetermined fastening strength of the adherend (51) including a friction material to the surface of the coating object (50) differs depending on the type of the coating object (50) or a product including the same, but the predetermined fastening strength is preferably 12 $N/mm^2$ or more when the product including the coating object (50) is a magnetic clutch rotor for an automobile air-conditioner.

In the present invention, by curing the uncured coated film (53') in a state being pressed by such a pressure, there is no need for the adhesion procedure in the prior art as explained above. A predetermined fastening strength of the adherend (51) including a friction material to the coating object (50) can be easily secured in a short curing time. In other words, in the present invention, it may become possible to eliminate the step in the prior art of coating an adhesive for the purpose of adhering the adherend and the surface of the paint film, which has been obtained after coating and curing a paint containing a thermosetting resin etc., on the surface of a coating object in advance, and thereby adhering the same, and thus an increase in the costs of the adhesive and other materials, the labor and time required for this step, and the cost of the equipment for it and the drop in productivity due to the load in quality control of the adhesive coated state are prevented, and further it becomes possible to reliably fasten the adherend to the coating object in a short time by the predetermined fastening strength.

The fastened composite in which the adherend (51) has been fastened to the coating object (50) in the second aspect of the present invention is explained below.

That is, in the fastened composite of the second aspect of the present invention, the adherend (51) including a friction material, the coating object (50), the curable resin-containing paint, and the coated film (53') which has been formed by the paint mean similar things as in the method of fastening in the first aspect of the present invention. Further, in the fastened composite, the coated film (53), which has been cured in the state where the adherend (51) being pressed by a predetermined pressure to closely contact the uncured coated film (53'), means a similar thing to that obtained by the method of fastening in the first aspect of the present invention.

In the fastened composite of the second aspect of the present invention, due to the coated film (53) which has been cured in the state of being pressed by a predetermined pressure, it is possible to obtain a fastened composite of an adherend (51) and a coating object (50) fastened by a sufficient strength without particular need for the adhesive layer in the prior art as explained above. The method and conditions of formation of the coated film (53') for obtaining this fastened composite, and the method and conditions of curing the coated film (53') are preferably similar to those in the method of fastening in the first aspect of the present invention.

In the second aspect of the present invention, it is possible to eliminate the adhesive layer in the prior art obtained by coating an adhesive, for the purpose of adhering the adherend and the surface of a paint film, obtained by coating and curing a paint containing a thermosetting resin etc., on the surface of the coating object in advance, to thereby adhere the two, and it is possible to easily provide a simpler three-layer structure fastened composite which is fastened by a predetermined fastening strength.

In addition, the method of measurement of the fastening strength of the adherend (51) including a friction material to the surface of the coating object (50) here may be a usually used method. Specifically, methods using a tensile adhesion strength test, tensile shearing adhesion strength test, compression shearing adhesion strength test, peeling adhesion strength test, impact adhesion strength test, bending adhesion strength test, and fracture adhesion strength test may be exemplified.

Referring to the drawings, embodiments which embody the method of fastening an adherend including a friction material to a coating object in the present invention is further explained below. The notations in parentheses described above are examples which show the correspondence with the specific descriptions in the embodiments explained below.

Figure 1A:
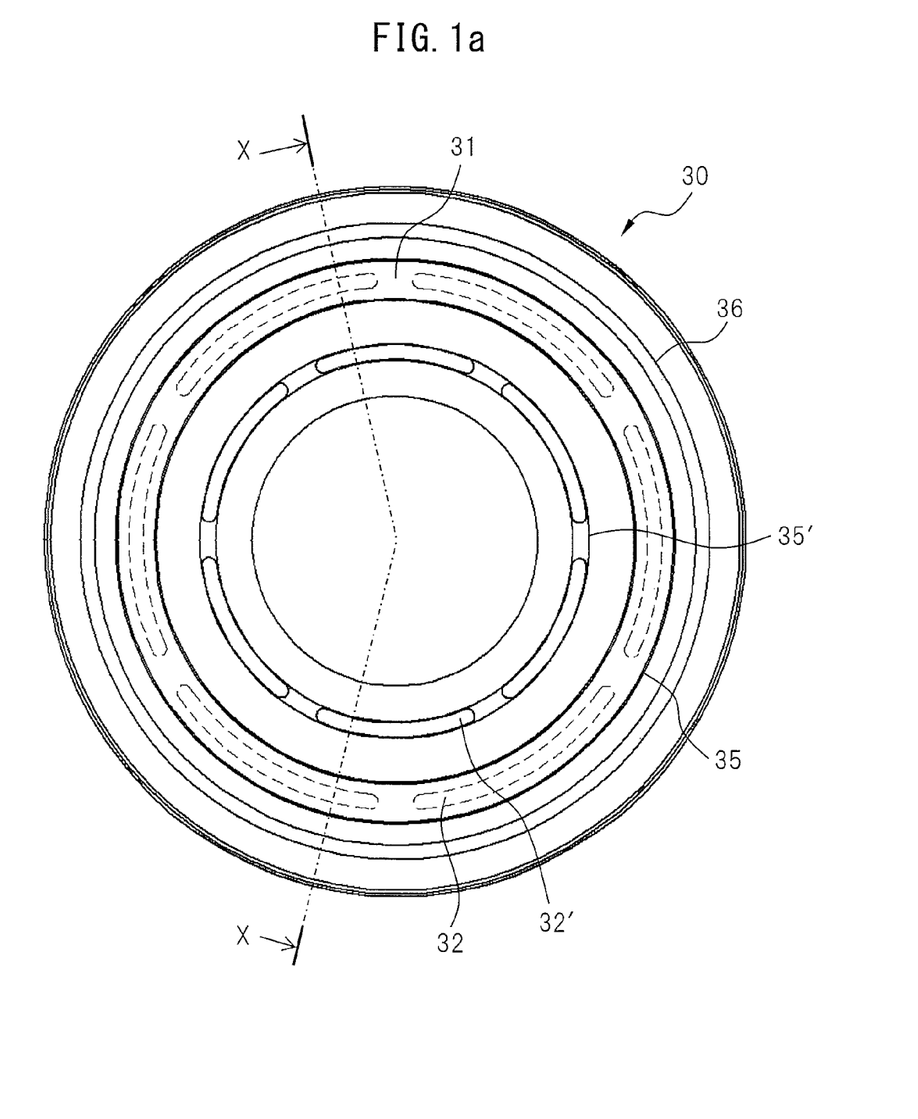
FIG. 1a is a plan view of a rotor in a magnetic clutch, which is a specific aspect of the fastened composite in the present invention.
Figure 1B:
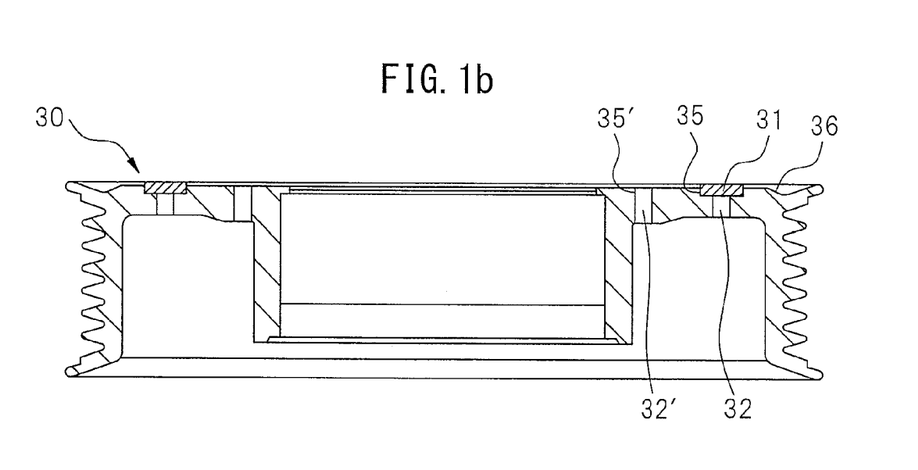
FIG. 1b is a cross-sectional view along X-X in FIG. 1a showing a rotor in a magnetic clutch which is a specific aspect of the fastened composite in the present invention.
Figure 1C:
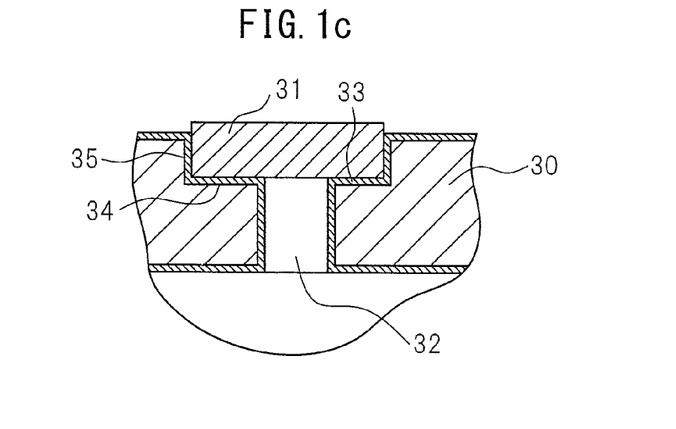
FIG. 1c is a cross-sectional enlarged view of a friction material-fastening portion in FIG. 1b showing a rotor in a magnetic clutch which is a specific aspect of the fastened composite in the present invention.

FIG. 1*a* to FIG. 1*c* show a rotor of a magnetic clutch of a specific example of a fastened composite in the present invention. FIG. 1*a* is a plan view of a rotor 30, being provided with a groove shape part 35 which is provided at its bottom surface with a plurality of arc-shaped through holes 32 which are provided at predetermined intervals, which has a rectangular cross-sectional shape ring-shaped friction material 31 fit into it to form a friction material-fastening portion corresponding to the fastened composite of the present invention, and which extends in a ring shape; a groove shape part 35' which is provided at its bottom surface with a plurality of arc-shaped through holes 32' which are provided at predetermined intervals and which extends in a ring shape; and a ring-shaped depression 36.

FIG. 1*b* is, as a cross-sectional view along X-X in FIG. 1*a*, a cross-sectional view of the rotor 30, including a groove shape part 35 which is provided with arc-shaped through holes 32 at its bottom surface and which forms the friction material-fastening portion in which the friction material 31 is fit and which corresponds to the fastened composite of the present invention; and a groove shape part 35' which is provided with arc-shaped through holes 32'.

FIG. 1*c* shows a cross-sectional enlarged view, in the rotor 30 shown in FIG. 1*b*, of a friction material-fastening portion corresponding to the fastened composite of the present invention, comprised of a groove shape part 35, with arc-shaped through holes 32 provided in its bottom surface, and with a cross-sectional shape rectangular ring-shaped friction material 31 of which the main part is fit in it. In other words, FIG. 1*c* shows the fastened composite of the present invention, comprised of a rotor 30 on the surface of which an uncured coated film has been formed with a thermosetting resin-containing paint, and a friction material 31 which is pressed against the uncured coated film at the bottom surface 34 of the groove shape part 35, in which state the coated film 33 is formed by being cured by heating, whereby the friction material 31 is fastened to the bottom surface 34 of the groove shape part 35.

Figure 2:
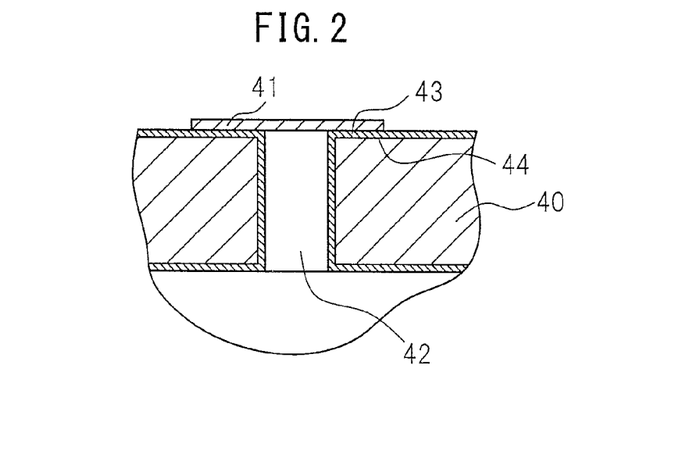
FIG. 2 is a cross-sectional enlarged view of a friction material-fastening portion in the case where the surface of the coating object does not have a groove shape, which is an example of the fastened composite in the present invention.

FIG. 2 is a cross-sectional enlarged view of an example of a fastened composite in the case where the surface of the coating object does not have a groove shape in the present invention. That is, FIG. 2 shows the fastened composite of the present invention comprised of, for example, a rotor 40 of a magnetic clutch, on the surface of which an uncured coated film has been formed by a thermosetting resin-containing paint, and a friction material 41 which is pressed against the uncured coated film at the top surfaces 44 of arc-shaped through holes 42 in which state the coated film 43 is formed by being cured by heating, whereby the friction material 41 is fastened to the surface 44 of the rotor 40.

Figure 3:
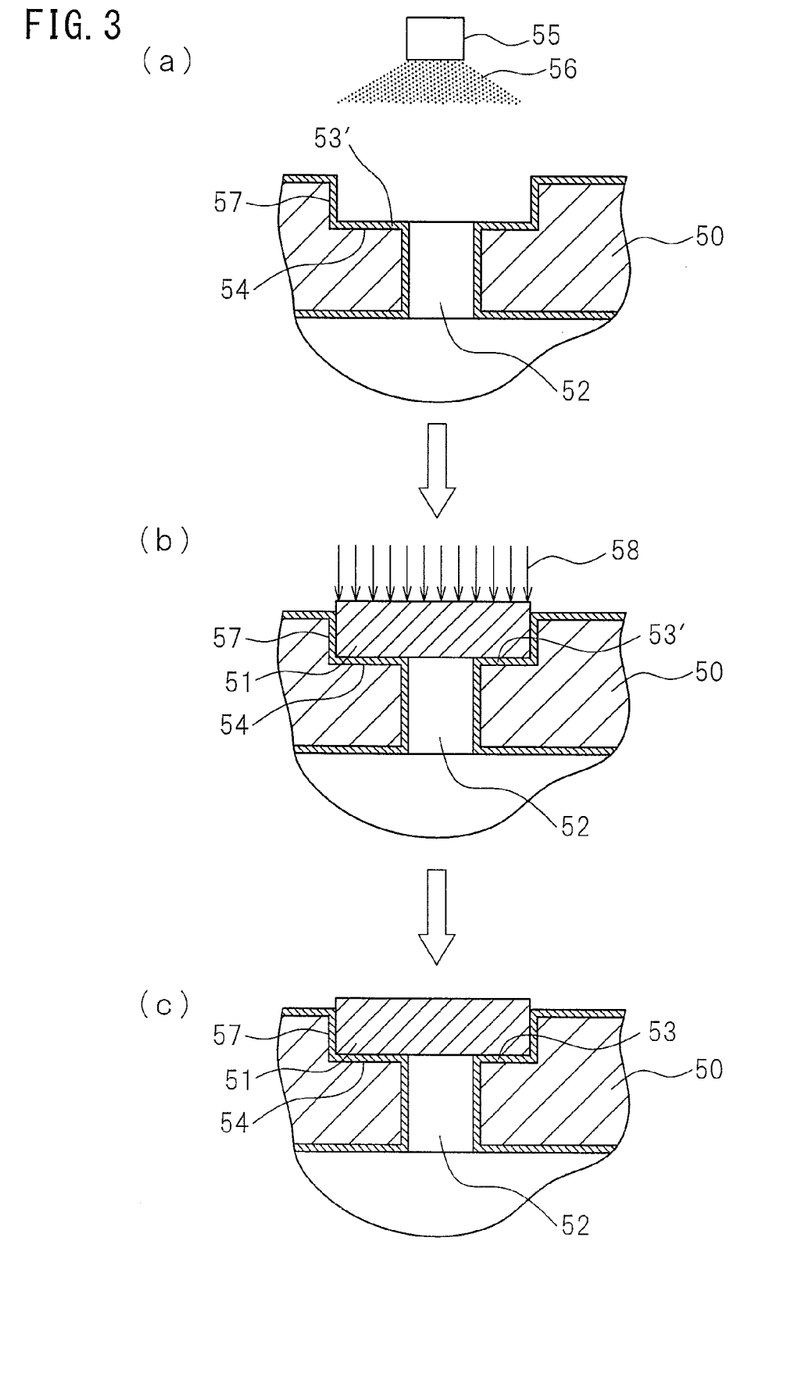
FIG. 3 is an explanatory view schematically showing as a processing flow an example of the method of fastening an adherend to a coating object in the present invention.

FIG. 3 schematically shows an example of a method of fastening an adherend including a friction material on a coating object in the present invention as a processing flow using the cross-sectional enlarged view of the fastening part. That is, in FIG. 3(*a*), an uncured coated film 53' is formed with a powder state curable resin-containing paint 56, which has been supplied from a feeding means 55 of the powder state curable resin-containing paint, on the surface of a rotor of a magnetic clutch such as shown in FIG. 1*a* to FIG. 1*c*, corresponding to a coating object 50 including a groove shape part 57 which is provided with arc-shaped through holes 52 at its bottom surface and which extends in a ring shape.

In FIG. 3(*b*), an adherend 51 including a friction material is arranged in the state of being pressed by a predetermined pressure 58 on the uncured coated film 53' on the bottom surface 54 and the two side surfaces of the groove shape part 57 of the coating object 50 which has been formed as shown in FIG. 3(*a*), and the uncured coated film 53' is heated under predetermined conditions by heat generated by an induction heating means (not shown).

In FIG. 3(*c*), a simpler three-layer structure fastened composite is obtained, which comprises an adherend 51 which has been fastened by a cured coated film 53 including a thermosetting resin on the bottom surface 54 and two side surfaces of a groove shape part 57 on a coating object 50, by being heated as shown in FIG. 3(*b*).

Figure 4:
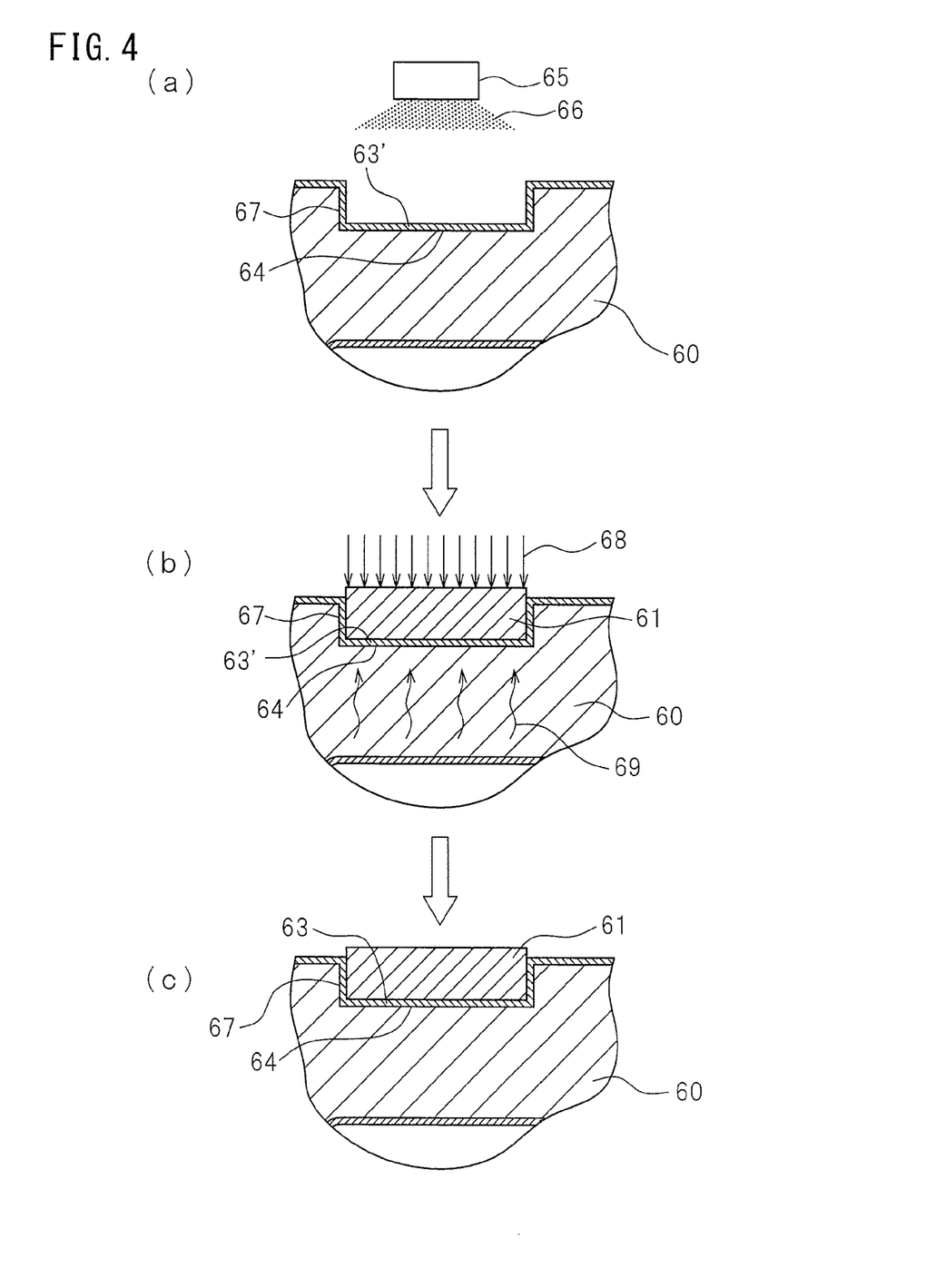
FIG. 4 is an explanatory view schematically showing as a processing flow an example of the method of fastening an adherend to a coating object in the present invention.

FIG. 4 schematically shows an embodiment of the method of fastening an adherend including a friction material on a coating object in the present invention, as a processing flow using the cross-sectional enlarged view of the fastening part. That is, in FIG. 4(*a*), an uncured coated film 63' is formed with a powder state curable resin-containing paint 66, which has been supplied from a feeding means 65 of the powder state curable resin-containing paint, on the surface of a rotor of a magnetic clutch such as shown in FIG. 1*a* to FIG. 1*c*, corresponding to a coating object 60 including a groove shape part 67 which is not provided with arc-shaped through holes 32 at its bottom surface.

In FIG. 4(*b*), an adherend 61 including a friction material is arranged in the state of being pressed by a predetermined pressure 68 on the uncured coated film 63' on the bottom surface 64 and the two side surfaces of the groove shape part 67 of the coating object 60 which has been formed as shown in FIG. 4(*a*), and the uncured coated film 63' is heated under predetermined conditions by heat generated by an induction heating means (not shown).

In FIG. 4(*c*), a simpler three-layer structure fastened composite is obtained, which comprises an adherend 61 which has been fastened by a cured coated film 63 including a thermosetting resin on the bottom surface 64 and two side surfaces of a groove shape part 67 on a coating object 60, by being heated as shown in FIG. 4(*b*).

In addition, for reference, FIG. 5 schematically shows, as an example relating to the prior art for clarifying the comparison with the embodiment of the method of fastening an adherend to a coating object of the present invention which is shown in FIG. 3, a four-layer structure adhered composite, obtained by coating an adhesive 4 or attaching an adhesive sheet 4, for the purpose of adhering the friction material 1, i.e., the adherend, and the surface of the paint film 3, which has been obtained by coating and curing a paint containing a thermosetting resin etc., on the surface of a rotor 2 which has arc-shaped through holes 5 and a groove shape in the magnetic clutch which is explained in detail in FIG. 6 in advance, and adhering the two whereby the friction material 1 is adhered to the rotor 2 of the magnetic clutch.

In this FIG. 5, the rotor 2 of the magnetic clutch is coated with paint containing a thermosetting resin etc.; by heating, the thermosetting resin is cured; and whereby the paint film 3 is formed. Then, on the cured paint film 3, an adhesive 4 is coated, or an adhesive sheet 4 is attached; the paint film 3 and the friction material 1 are bonded in the state with the friction material 1 arranged on it; and whereby a four-layer structure adhered composite with a friction material 1 bonded to the rotor 2 of the magnetic clutch is formed.

EXAMPLES

Example 1

As shown in FIGS. 3(*a*) to (*c*), a coated film 53' with a substantially uniform thickness of 50 μm was formed by supplying a powder state thermosetting resin-containing paint 56 with an average particle size of 30 to 40 μm, containing a thermosetting resin, i.e., an epoxy resin, (60.0 wt %), a curing agent (2.0 wt %), an additive (2.0 wt %) and a pigment (36.0 wt %) from an electrostatic powder spraying type feeding means 55 on the entire surface of a rotor 50 of a magnetic clutch, i.e., the coating object, mainly comprised of iron, and provided with a ring-shaped groove shape part 57 having a 81.7 mm inside diameter, 95.4 mm outside diameter, 6.9 mm width and 1.7 mm depth, on which a ring-shaped friction member 51 (inside diameter 81.9 mm, outside diameter 95.3 mm, width 6.7 mm and thickness 2.0 mm) of a porous composite material, i.e., the adherend including a friction material, comprised mainly of a fiber base material should be fastened; and powder-coating by a frictional charging method. At the back side of the ring-shaped groove shape part 57 at the rotor 50 of the magnetic clutch, i.e., the bottom part of the groove shape part 57, six arc-shaped through holes 52 for interrupting the magnetic paths were provided at equal intervals around the entire circumference.

The coated film 53' was cured by arranging the above-described porous ring-shaped friction member 51 on the thus-obtained uncured coated film 53' at the bottom surface 54 of the ring-shaped groove shape part 57 of the rotor 50 of the magnetic clutch, as shown in FIG. 3(b); raising the temperature of the uncured coated film 53' to about 190 to 240° C. (measured by thermocouple (not shown)) by heating overall with heat generated by an induction heating means (not shown), i.e., low-frequency induction heating, while applying a pressing pressure 58 of 250 kPa; and then stopping the induction heating and maintaining the temperature for about 40 seconds.

As a result, as shown in FIG. 3(c), a simpler three-layer structure fastened composite was obtained, which was comprised of the rotor 50 of the magnetic clutch, i.e., the coating object, and the ring-shaped friction member 51, i.e., the adherend, fastened by only the coated film 53 containing a thermosetting resin, cured at the bottom surface 54 of the ring-shaped groove shape part 57. According to a method of measuring an adhesive strength by pressing a rectangular flat surface fixture having a front end shape of 1 mm×5 mm from the back side of the ring-shaped groove shape part 57 of the rotor 50 of the magnetic clutch, i.e., the side of the arc-shaped through holes 52 provided at equal intervals over the entire circumference of the bottom surface of the groove shape part 57, and fracturing the ring-shaped friction member 51, i.e., the adherend, fastened to the bottom surface and two side surfaces of the ring-shaped groove shape part 57 other than the opening parts of the through holes, the fastening strength of the ring-shaped friction member 51 to the rotor 50 of the magnetic clutch was 40 N/mm$^2$, where the ring-shaped friction member reached the base material destruction. The three-layer structure fastened composite which was fastened by this fastening strength could be used for a clutch for transmitting a rotational drive force to a compressor for an automobile air-conditioner.

Example 2

As shown in FIGS. 4(a) to (c), a coated film 63' with a substantially uniform thickness of 50 μm was formed by supplying a powder state thermosetting resin-containing paint 66 with an average particle size of 30 to 40 μm, containing a thermosetting resin, i.e., an epoxy resin, (60.0 wt %), a curing agent (2.0 wt %), an additive (2.0 wt %) and a pigment (36.0 wt %) from an electrostatic powder spraying type feeding means 65 on the entire surface of a rotor 60 of a magnetic clutch, i.e., the coating object, mainly comprised of iron, and provided with a ring-shaped groove shape part 67 having a 81.7 mm inside diameter, 95.4 mm outside diameter, 6.9 mm width and 1.7 mm depth, on which a ring-shaped friction member 61 (inside diameter 81.9 mm, outside diameter 95.3 mm, width 6.7 mm and thickness 2.0 mm) of a porous composite material, i.e., the adherend including a friction material, comprised mainly of a fiber base material should be fastened; and powder-coating by a frictional charging method.

The coated film 63' was cured by arranging the above-described porous ring-shaped friction member 61 on the thus-obtained uncured coated film 63' at the bottom surface 64 of the ring-shaped groove shape part 67 of the rotor 60 of the magnetic clutch, as shown in FIG. 4(b); raising the temperature of the uncured coated film 63' to about 190 to 240° C. (measured by thermocouple (not shown)) by heating overall with heat 69 generated by an induction heating means (not shown), i.e., low-frequency induction heating, while applying a pressing pressure 68 of 250 kPa; and then stopping the induction heating and maintaining the temperature for about 40 seconds.

As a result, as shown in FIG. 4(c), a simpler three-layer structure fastened composite was obtained, which was comprised of the rotor 60 of the magnetic clutch, i.e., the coating object, and the ring-shaped friction member 61, i.e., the adherend, fastened by only the coated film 63 containing a thermosetting resin, cured at the bottom surface 64 of the ring-shaped groove shape part 67. According to a method of measuring an adhesive strength by fracturing the ring-shaped friction member 61, i.e., the adherend, fastened to the bottom surface 64 and two side surfaces of the ring-shaped groove shape part 67, the fastening strength of the ring-shaped friction member 61 to the rotor 60 of the magnetic clutch was 40 N/mm$^2$, where the ring-shaped friction member reached the base material destruction. The three-layer structure fastened composite which was fastened by this fastening strength could be used for a clutch for transmitting a rotational drive force to a compressor for an automobile air-conditioner.

Example 3

As shown in FIG. 3(a), a coated film 53' with a substantially uniform thickness of 50 μm is formed by supplying a powder state active energy ray-curing resin-containing paint 56 with an average particle size of 30 to 40 μm, containing an active energy ray-curing resin "CYCLOMER P (ACA) Z-251" (60.0 wt %) from Daicel Chemical Industries, Ltd., i.e., a (meth)acrylic polymer in the side chain of which a photopolymerizable unsaturated group has been introduced by reacting an epoxy group of 3,4-epoxy cyclohexenyl methyl acrylate with a part of carboxyl groups of (meth) acrylic acid-(meth)acrylic acid ester copolymer, a photopolymerization initiator (2.0 wt %), an additive (2.0 wt %) and a pigment (36.0 wt %) from an electrostatic powder spraying type feeding means 55 on the entire surface of a rotor 50 of a magnetic clutch, i.e., the coating object, mainly comprised of iron, and provided with a ring-shaped groove shape part 57 having a 81.7 mm inside diameter, 95.4 mm outside diameter, 6.9 mm width and 1.7 mm depth, on which a ring-shaped friction member 51 (inside diameter 81.9 mm, outside diameter 95.3 mm, width 6.7 mm and thickness 2.0 mm) of a porous composite material, i.e., the adherend including a friction material, comprised mainly of a fiber base material should be fastened; and powder-coating by a frictional charging method. At the back side of the ring-shaped groove shape part 57 at the rotor 50 of the magnetic clutch, i.e., the bottom part of the groove shape part 57, six arc-shaped through holes 52 for interrupting the magnetic paths are provided at equal intervals around the entire circumference.

The coated film 53' is cured by arranging the above-described porous ring-shaped friction member 51 on the thus-obtained uncured coated film 53' at the bottom surface 54 of the ring-shaped groove shape part 57 of the rotor 50 of the magnetic clutch, as shown in FIG. 3(b); irradiating ultraviolet rays (300 to 450 nm) on the coated film 53' at 400 mJ/cm$^2$ (about 40 seconds) using an ultraviolet exposure apparatus (made by Orc Manufacturing, Model HMW-680GW, using metal halide lamp 7 kW) (not shown), while applying a pressing pressure 58 of 250 kPa; and then heat-curing at 150° C. for 60 minutes (inside furnace: 70 minutes).

As a result, as shown in FIG. 3(*c*), a simpler three-layer structure fastened composite is obtained, which is comprised of the rotor 50 of the magnetic clutch, i.e., the coating object, and the ring-shaped friction member 51, i.e., the adherend, fastened by only the coated film 53 containing a thermosetting resin, cured at the bottom surface 54 of the ring-shaped groove shape part 57. The three-layer structure fastened composite which is fastened by such a manner can be used for a clutch for transmitting a rotational drive force to a compressor for an automobile air-conditioner.

What is claimed is:

1. A method of fastening an adherend, which includes a friction material, to a coating metallic object, requiring improvement of corrosion resistance, comprising;
    forming on all of surfaces of said coating metallic object, including an adherend-arrange surface where said adherend should be arranged at said coating metallic object, an uncured coated film with a curable resin-containing paint; and
    fastening said adherend to said adherend-arrange surface of said coating metallic object, by subjecting heating and/or irradiation of an active energy ray to said uncured coated film on said all of surfaces, while making said adherend closely contact said uncured coated film on said adherend-arrange surface to press it by a predetermined pressure, to cure said uncured coated film on said all of surfaces.

2. The method of fastening according to claim 1, wherein said curable resin-containing paint is in a powder state, and wherein said uncured coated film on said all of surfaces is formed by coating said powder state curable resin-containing paint using triboelectric charging type powder coating.

3. The method of fastening according to claim 1, wherein said adherend-arrange surface of said coating metallic object forms a groove shape, and wherein said uncured coated film is formed on a bottom surface and two side surfaces of said groove shape.

4. The method of fastening according to claim 1, wherein said curable resin-containing paint is a thermosetting resin-containing paint, and wherein said heating is performed by induction heating.

5. A fastened composite in which an adherend including a friction material has been fastened to a coating metallic object, requiring improvement of corrosion resistance, wherein said adherend is fastened on an adherend-arrange surface, where said adherend should be arranged, at said coating metallic object by a coated film cured in a state being closely contact with said adherend, while said adherend being pressed at a predetermined pressure to an uncured coated film on said adherend-arrange surface, wherein said uncured coated film being formed with a curable resin-containing paint on all of surfaces of said coating metallic object, including said adherend-arrange surface of said coating metallic object, and said uncured coated film on said all of surfaces being cured.

* * * * *